(12) United States Patent
Pesl

(10) Patent No.: US 6,257,369 B1
(45) Date of Patent: Jul. 10, 2001

(54) DEVICE FOR CLEANING AND LUBRICATING DRIVE CHAINS

(76) Inventor: Josef Pesl, Reith 80, A-5091, Unken (AT)

(*) Notice: Subject to any disclaimer, the term of this patent is extended or adjusted under 35 U.S.C. 154(b) by 0 days.

(21) Appl. No.: 09/380,199
(22) PCT Filed: Mar. 5, 1998
(86) PCT No.: PCT/AT98/00053
  § 371 Date: Aug. 26, 1999
  § 102(e) Date: Aug. 26, 1999
(87) PCT Pub. No.: WO98/40662
  PCT Pub. Date: Sep. 17, 1998

(30) Foreign Application Priority Data

Mar. 7, 1997 (AU) .................................................. 386/97

(51) Int. Cl.⁷ .................................................. F16N 7/00
(52) U.S. Cl. .................... 184/15.1; 184/15.2; 184/15.3
(58) Field of Search ................. 184/15.1, 15.2, 184/15.3

(56) References Cited

U.S. PATENT DOCUMENTS

| | | |
|---|---|---|
| 4,593,923 * | 6/1986 | Thalmann ............................ 280/261 |
| 4,783,186 | 11/1988 | Manning . |
| 5,020,637 | 6/1991 | Hoenselaar et al. . |
| 5,069,470 * | 12/1991 | Spencer ............................ 280/288.4 |
| 5,213,180 | 5/1993 | Masonek et al. . |
| 5,360,084 | 11/1994 | Graf . |
| 5,484,038 | 1/1996 | Rowell . |

FOREIGN PATENT DOCUMENTS

| | | |
|---|---|---|
| 3839076 | 6/1989 | (DE) . |
| 20597 | 9/1900 | (GB) . |

* cited by examiner

Primary Examiner—David Fenstermacher
(74) Attorney, Agent, or Firm—Dykema Gossett PLLC

(57) ABSTRACT

An apparatus for cleaning and lubricating drive chains, in particular of motorcycles, include a substantially closed housing formed of two mutually connectable halves providing openings for allowing the drive chain to pass through and includes brushes which are attached in the housing to wipe off the drive chain. An easy and effective cleaning is achieved by using nozzles in the housing which are directed against the drive chain and are in connection with connections on the outside of the housing. The housing also provides with a drainage opening which is arranged for the bleeding off of the media injected into the apparatus.

6 Claims, 3 Drawing Sheets

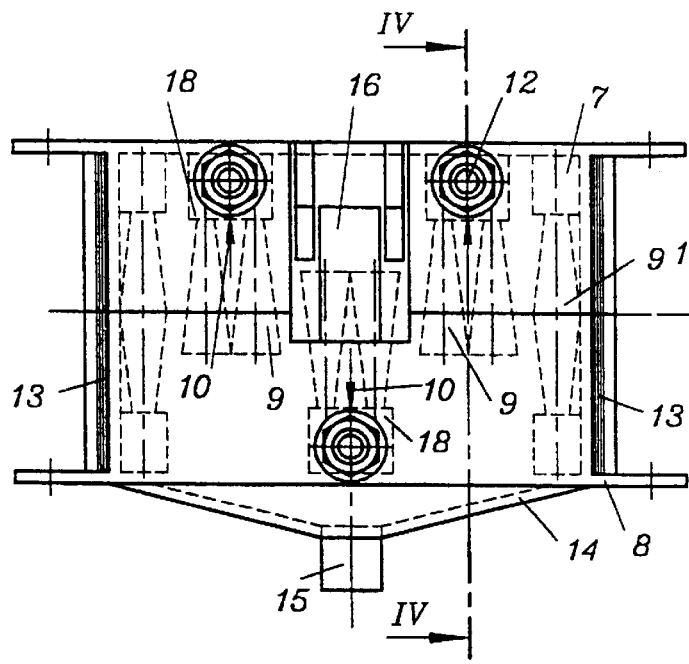
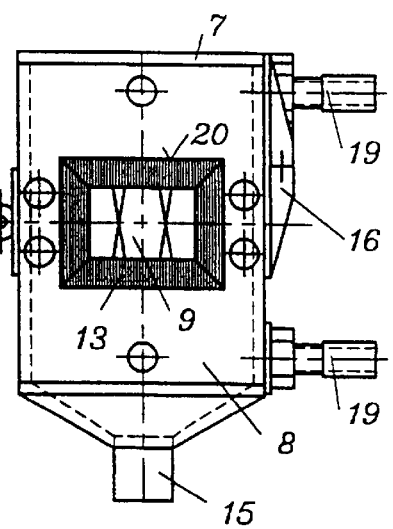
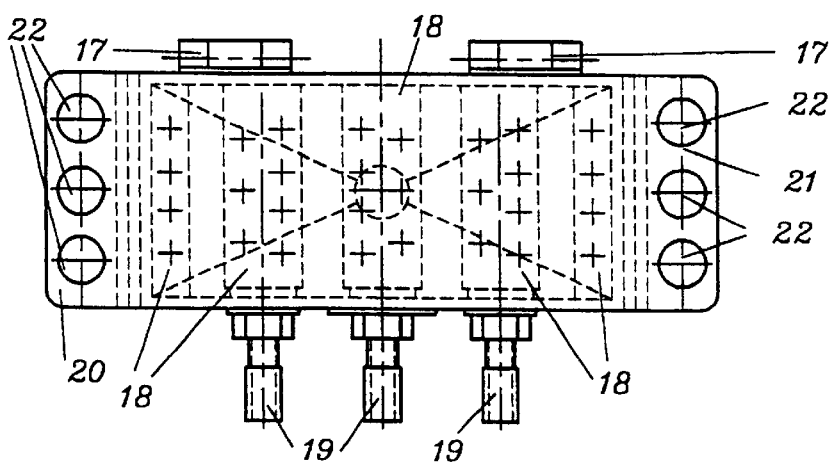

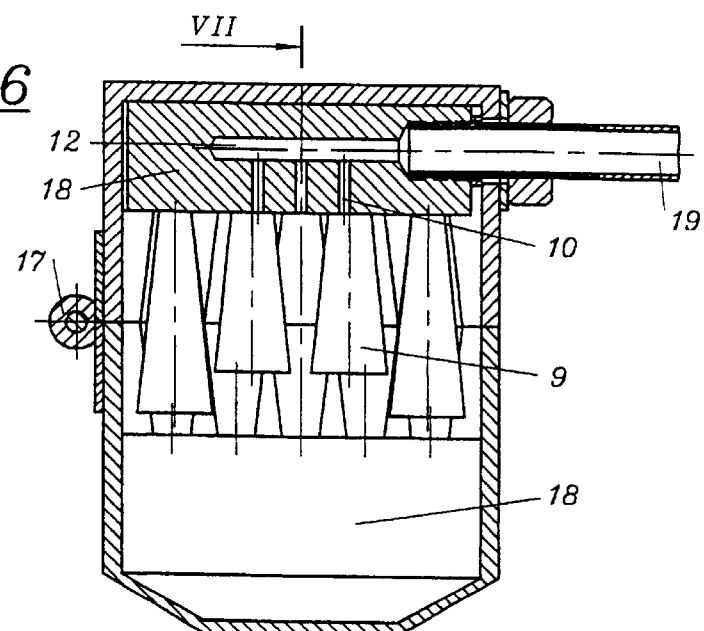
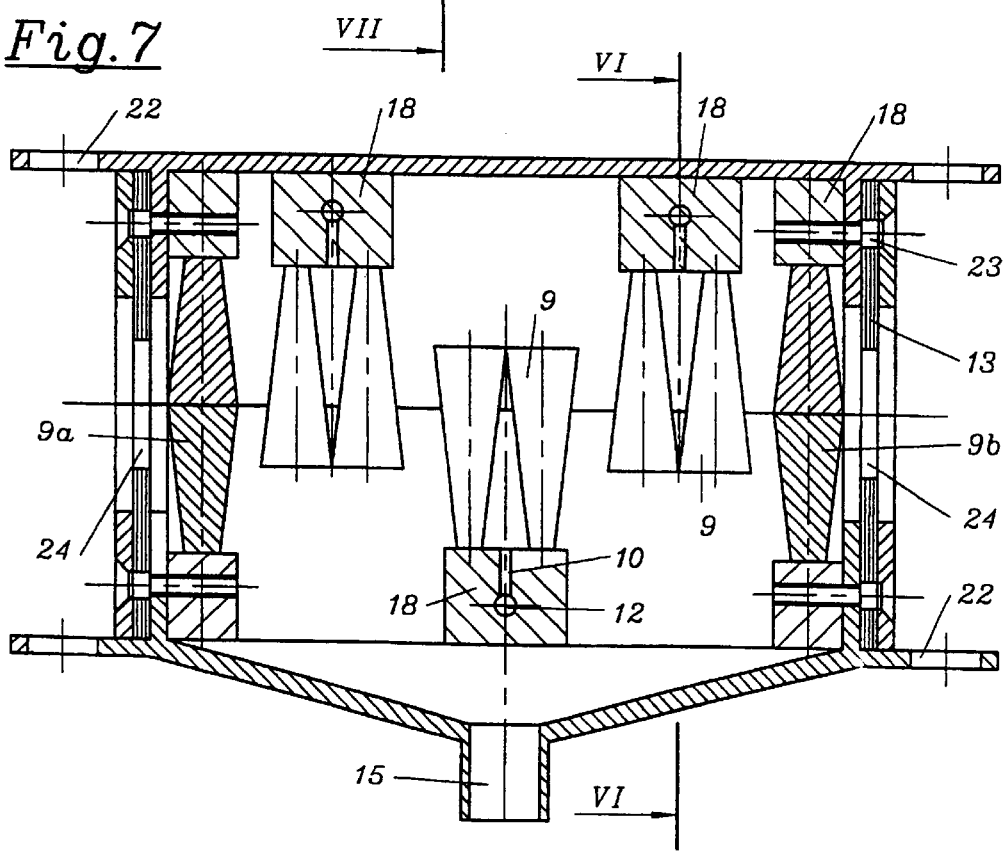

DEVICE FOR CLEANING AND LUBRICATING DRIVE CHAINS

BACKGROUND OF THE INVENTION

1. Field of the Invention

The present invention relates to an apparatus for cleaning and lubricating drive chains.

2. The Prior Art

The service life of drive chains for motorcycles, agricultural machines and the like substantially depends on the maintenance and cleaning during operation. Small foreign bodies such as sand or the like which adhere to the links of the drive chain considerably reduce the service life. That is why regular maintenance and cleaning of the drive chains is important. The cleaning process with currently known apparatuses, however, is very difficult and generally connected with a considerable pollution to the ambient environment and the adjacent components.

DE 38 39 076 A discloses a device for cleaning and drying chains for racing bicycles which includes a two-part housing through which the chain is guided. Wheels with bristles are arranged in the housing which, on the one hand, mechanically clean the chain and, on the other hand, deflect it into the lower region of the housing. A trough is formed in the lower region of the housing which can receive a cleaning medium. The chain is cleaned by the immersion in the cleaning medium. Depending on the tension of the chain, the deflection of the chain requires a relatively large force which must be absorbed by the device. Moreover, a further disadvantage of this known solution is that the dirt detaching from chain accumulates in the trough and can partly end up back on the chain again. Moreover, the inner side of the chain whose cleaning and lubrication is particularly critical is disadvantaged in this method.

An apparatus for cleaning and lubricating bicycle chains is further disclosed in GB 20 597 A. The chain to be cleaned is guided past a small wheel which is immersed in the trough which contains a lubricant. The lubricant is applied to the chain by the rotation of the wheel. The cleaning effect of such an apparatus is extremely limited, because only very coarse dirt adhering to the chain can be stripped off.

An apparatus for lubricating and cleaning chains and rails is further known from EP 0 599 087 A. Several shoe-like modules are connected successively which enclose the chain to be cleaned on three sides and are provided with brushes and cleaning nozzles. Since this system is downwardly open it can only be used in a workshop or the like where a considerable pollution of the environment with dirt is tolerable. A similar apparatus is described in WO 86/05153.

It is the object of the present invention to develop an apparatus of the kind mentioned above in such a way that a reliable and efficient cleaning of drive chains is enabled and this cleaning can be performed with little effort without any pollution of the environment with dirt.

SUMMARY OF THE INVENTION

According to relevant aspect in the present invention the cleaning occurs in an all enclosed housing, with the cleaning medium coming only once into contact with the chain and thereafter is collected and drawn off. The application occurs by nozzles facing the drive chain in order to increase the efficiency of the cleaning. The aforementioned also applies analogously to a lubricant which can be applied after the cleaning on the drive chain. The particularly relevant aspect is here that no lubricant can escape in any uncontrolled manner from the apparatus into the ambient environment. That is why the apparatus in accordance with the invention can also be used in locations where any pollution to the environment is prohibited.

By sealing the entrance and exit places of the drive chain by rubber lips or the like, it can be ensured that no leakage will occur at these places even in the case of different dimensions of drive chains.

It is particularly appropriate when the nozzles are enclosed on either side by brushes. The upstream brushes are provided with the task of a preliminary mechanical cleaning, whereas the downstream brushes, on the one hand, allow the further wiping off of dirt particles which, although loosened by the cleaning medium, may under certain circumstances not yet be fully removed and, on the other hand, wipe off the adhering cleaning medium or excessive lubricant.

A particularly simple arrangement of the apparatus is achieved in that fixing elements are arranged in the housing which are both provided with nozzles and also hold the brushes.

BRIEF DESCRIPTION OF THE DRAWINGS

The present invention is now explained below in closer detail by reference to the embodiments illustrated in the drawings.

FIG. 3 shows a side view of a further embodiment of the invention;

FIG. 4 shows a sectional view along line IV—IV in FIG. 3;

FIG. 5 shows a view of the lower half of the housing from above;

FIG. 6 shows a further embodiment of the invention in a sectional view along line VI—VI in FIG. 7 and FIG. 7 shows a sectional view along line VII—VII in FIG. 6.

DETAILED DESCRIPTION OF THE PREFERRED EMBODIMENTS

Figure 1:
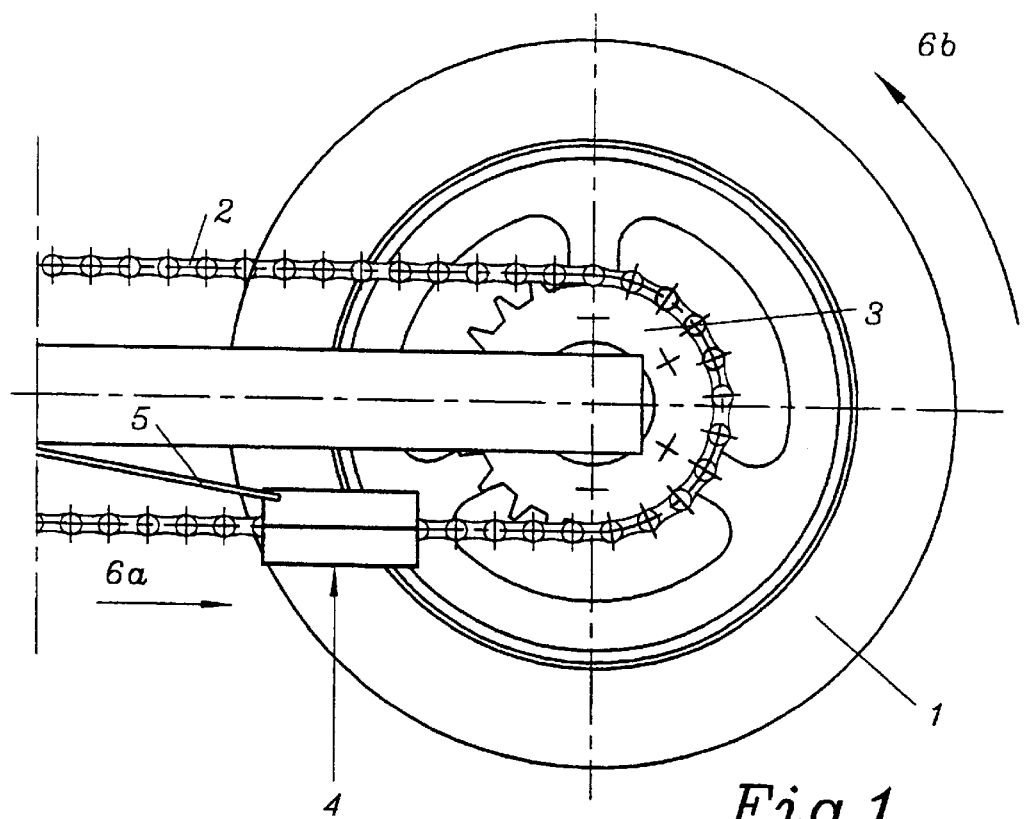
FIG. 1 shows a part of a drive chain of a motorcycle with the apparatus in accordance with the invention.

FIG. 1 shows the rear wheel 1 of a motorcycle. Rear wheel 1 is driven by a drive chain 2 which is wrapped around a sprocket wheel 3 in the known manner. The apparatus 4 in accordance with the invention is arranged on the lower strand of the chain, which apparatus fastened with a schematically shown fastening bracket 5 to a fixed structural part of the motorcycle. During the cleaning and lubricating process the drive chain 2 is moved in the direction of arrow 6a, so that rear wheel 1 turns in the direction of the arrow 6b. During the cleaning or lubricating process the motorcycle is jacked up or parked on the motorcycle stand, so that the rotation of the rear wheel 1 is not obstructed.

Figure 2:
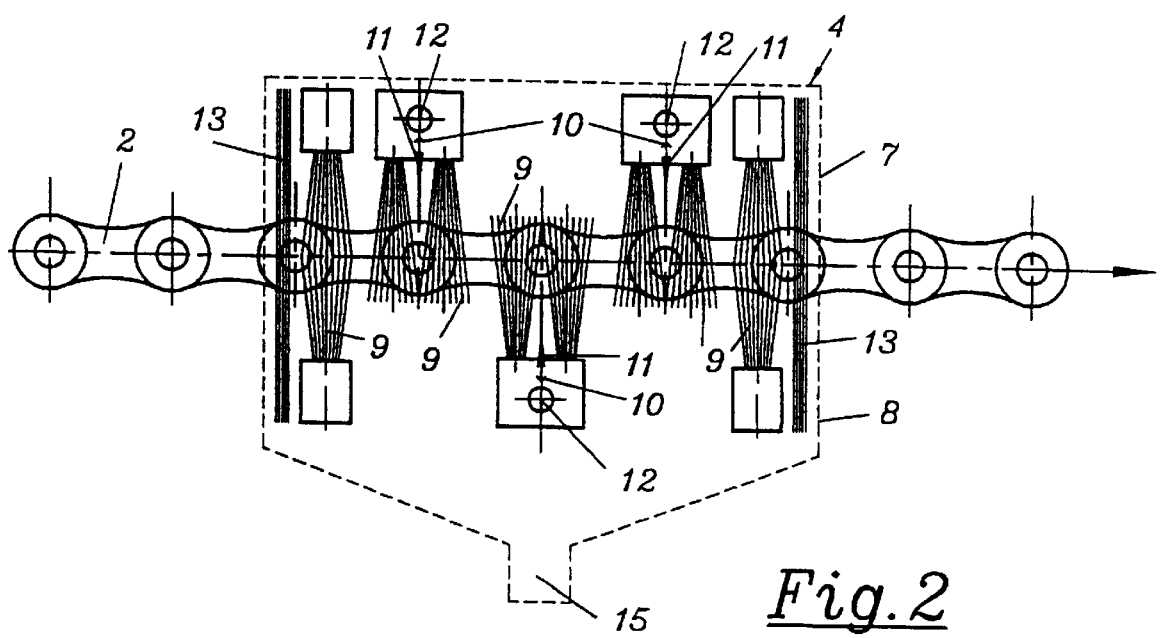
FIG. 2 shows a schematic sectional view through the apparatus.

FIG. 2 shows the principal arrangement of the apparatus in accordance with the invention. The housing halves 7, 8 of the apparatus 4 in accordance with the invention are shown in FIG. 2 with the broken lines. Brushes 9 are arranged in the interior of the housing halves 7, 8, which brushes wipe off the drive chains 2 from different directions. Nozzles are schematically indicated with numeral 10 in order to spray a cleaning agent or lubricating agent onto the chain in the direction of arrow 11. The cleaning or lubricating agent is guided through bores 12 to nozzles 10. Rubber lips 13 are arranged at the pass-through locations of chain 2 in order to seal the apparatus in these zones too. The lower half of the housing 8 is provided with a funnel-like arrangement in the lower zone 14 and is provided with an drainage opening 15.

The illustration of FIG. 3 shows that the two housing halves 7 and 8 are mutually connected by a snap connection 16. As is illustrated in FIG. 4, hinges 17 are attached at the opposite side of the snap connection 16 in order to enable the housing halves 7, 8 to be flipped apart. Brushes 9 and nozzles 10 are each jointly arranged in fixing elements 18 which extend substantially transversally to the axial direction of the apparatus. The bores 12 in the fixing elements 18 are in connection with connecting elements 19 on which tubes can be inserted in order to introduce a cleaning or lubricating agent into the interior of apparatus 4. A simple spray bottle can be used for example. However, the respective medium can also be supplied by way of a spray gun with compressed air. Brushes 9 are arranged on either side of nozzles 10 in order to wipe off any excessive clearing or lubricating agent from the chain.

FIG. 4 shows the precise arrangement of the rubber lips 13. A leaf of the rubber lips projects from each of the sides of a rectangular recess 20 into the housing halves 7 and 8. The dimensions of the rubber lips 13 are chosen in such a way that the remaining opening is smaller than the cross section of the drive chain.

FIG. 5 shows that flanges 20, 21 are provided in the lateral zones of the apparatus, which flanges are provided with bores 22. Bores 22 are used for inserting a wire bracket or the like, as is schematically shown in FIG. 1 with numeral 5. This ensures that even during any movement of the drive chain 2 the apparatus will remain at the intended location.

FIGS. 6 and 7 show a slightly altered embodiment of the invention in a detailed illustration. The respective components are shown with the same reference numerals as in the aforementioned embodiment and a detailed description has therefore been omitted. In this embodiment the brushes 9 are provided with a shorter arrangement in the middle section than in the lateral section. Each fixing element 18 is provided with three nozzles 10 in order to ensure an optimal distribution of the cleaning and lubricating agent. FIG. 7 further shows that the rubber lips 13 are screwed together with the fixing elements 18 of the outermost brushes 9a and 9b by way of screwed connections 23. The brushes 9a and 9b are provided with a denser arrangement than the middle brushes 9 in order to ensure an additional sealing effect towards the openings 24 for the passage of the drive chains.

The present invention allows cleaning and lubricating the drive chain 2 of a motorcycle in an effective manner. As a result of the special arrangement of the apparatus, it is possible to practically completely prevent any pollution of the ambient environment. Moreover, the consumption of cleaning and lubricating agents are very low compared with alternative solutions. The apparatus in accordance with the invention is particularly light, easy to use and user-friendly.

What is claimed is:

1. An apparatus for cleaning and lubricating a drive chain which comprises a housing for enclosing the drive chain on all sides, said housing consisting of two mutually connectable halves which, when connected, define inlet and outlet openings for allowing the drive chain to pass through and which provide a funnel-shaped lower area and a drainage opening to discharge media collected in the lower area, and brushes which are attached in the housing to wipe off the drive chain and include inwardly facing nozzles, and connection means which extend into the housing to supply media to said nozzles.

2. An apparatus according to claim 1, including rubber lips for closing said inlet and outlet openings.

3. An apparatus according to claim 1, wherein the nozzles are encompassed by brushes on either side in the direction of movement of the drive chain.

4. An apparatus according to claim 1, wherein the housing consists of an upper and a lower half of the housing and that brushes are attached on both halves of the housing.

5. An apparatus according to claim 1, wherein nozzles are directed both against the upper side as well as the lower side of the drive chain.

6. An apparatus according to claim 1, wherein fixing elements are arranged which are both provided with nozzles as well as hold brushes.

* * * * *